June 15, 1943.  F. C. FRANK  2,322,121
BRAKE
Filed March 27, 1940  3 Sheets-Sheet 2
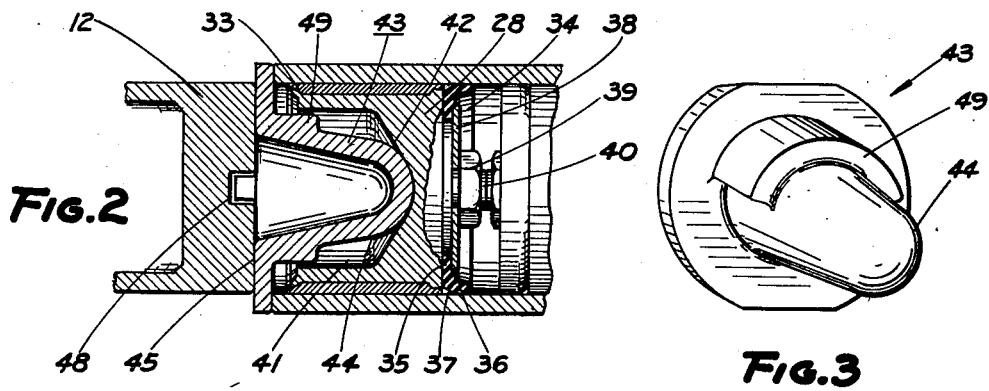
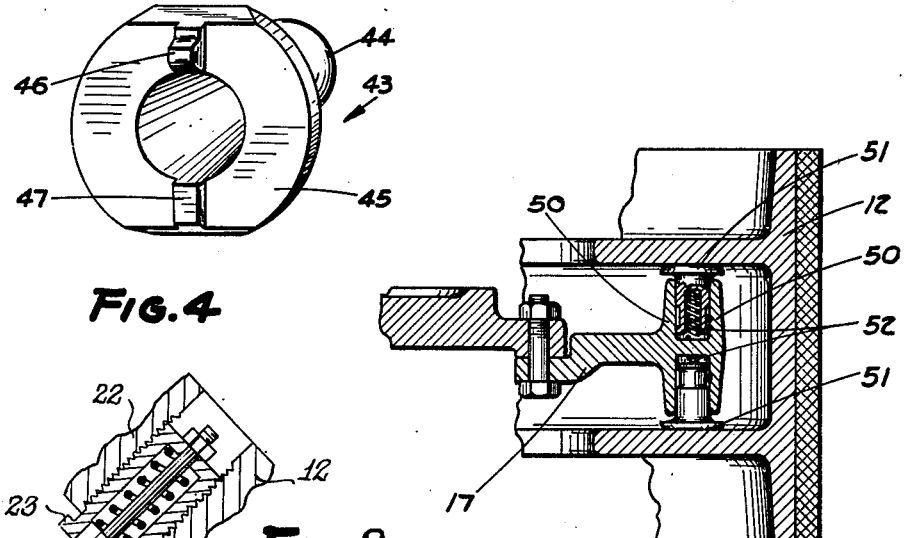
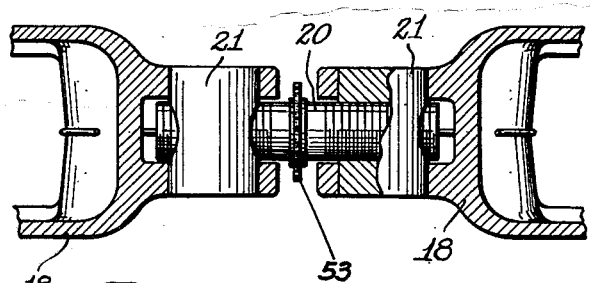
INVENTOR.
FREDERICK C. FRANK
BY
M. W. McConkey
ATTORNEY.

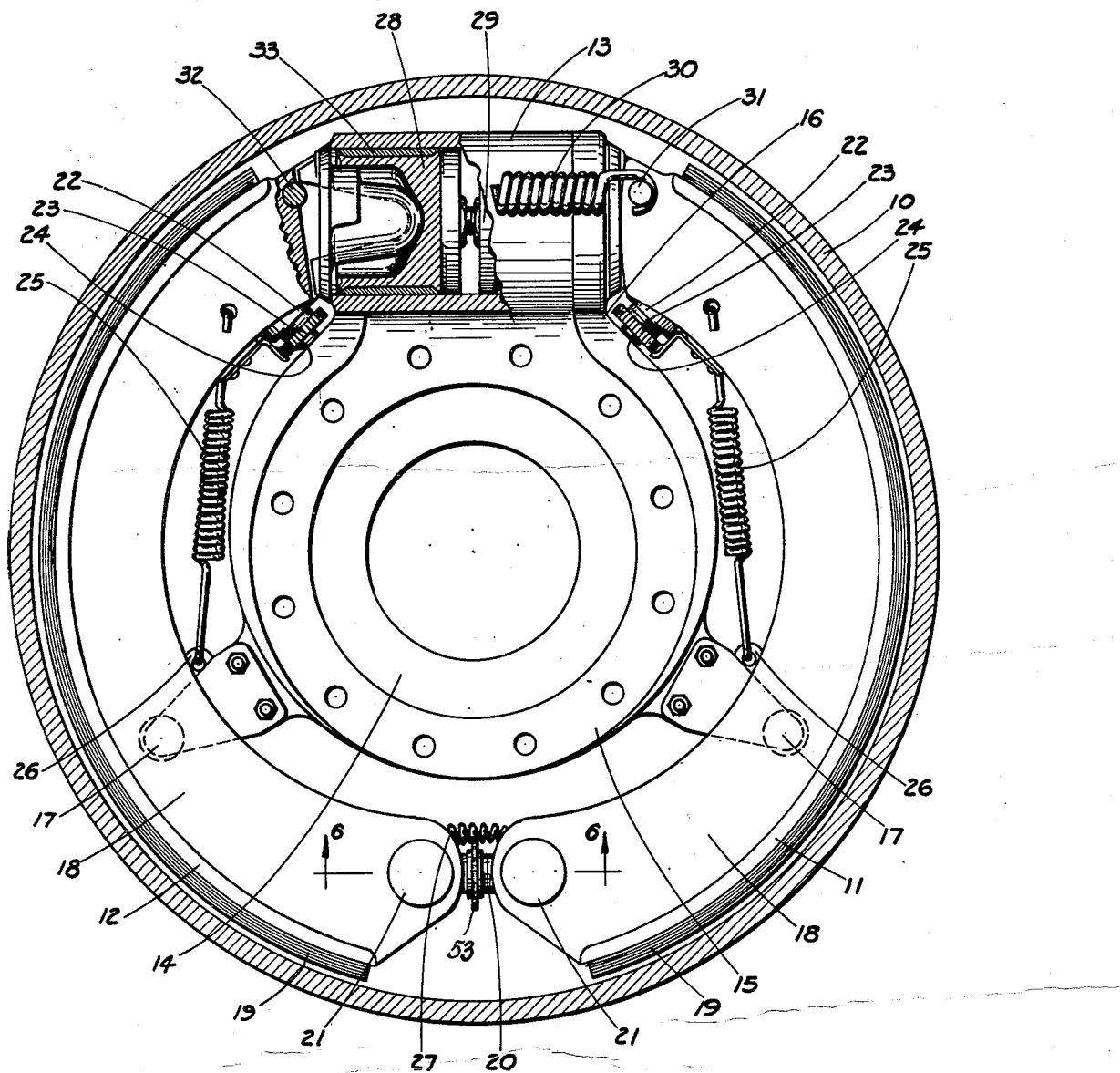

Patented June 15, 1943

2,322,121

UNITED STATES PATENT OFFICE

2,322,121

BRAKE

Frederick C. Frank, South Bend, Ind., assignor to Bendix Aviation Corporation, South Bend, Ind., a corporation of Delaware Application March 27, 1940, Serial No. 326,121

9 Claims. (Cl. 188—152)

This invention relates to improvements in fluid pressure brakes.

The preferred form of my invention, which is shown herein, is particularly applicable to airplane brakes. The problems which I have solved in developing my improved brakes are problems which have usually arisen in the use of airplane brakes. However, the solutions presented herein are equally available in any type of fluid pressure brakes and on any vehicle.

As is well understood in the brake art, there is a wrapping movement of the brake shoes against the brake drum during application of the brakes. This wrapping effect is particularly noticeable in shoes of the shiftable anchorage type, wherein the direction of rotation determines which of two brake shoes will serve as an anchoring, or secondary, shoe and which will serve as an applying, or primary shoe. In brakes of the type described herein which use hydraulic wheel cylinders for spreading the shoes, the primary shoe tends to move downward from the center of the applying cylinder and the secondary shoe tends to move upward from the center of the applying piston. This same tendency also exists in brakes which have separately anchored shoes. In that case, however, the anchoring end of each shoe tends to move farther from a line connecting the midpoints of the two shoes and the applying end of the shoe tends to move toward such connecting line.

The result in either case tends to cause a twisting or cocking of the pistons in the wheel cylinders, and this twisting motion places uneven stresses against different points along the walls of the cylinders.

It is an object of my invention to provide means for preventing the cocking of the pistons in a hydraulic wheel cylinder.

A further object is to provide a non-metallic contacting member between the inner wall of the wheel cylinder and the piston or pistons reciprocable therein.

Another object of my invention is to provide a novel centering device to prevent excessive movement of the brake shoes inwardly or outwardly of the brake drum, while at the same time allowing a necessary amount of adjusting movement in the brake parts.

An object of my invention is to furnish an adjusting screw for a pair of shiftable anchorage brakes together with a means for locking the adjustment screw.

In airplanes it is sometimes desired to provide a single reservoir or source of fluid pressure for all the controls that are hydraulically operated. The customary fluid for the controls other than the brakes is mineral oil. In order to connect the brakes to the same source of fluid as the other controls, it is necessary to use mineral oil as a brake fluid. However, several disadvantages are attendant upon use of mineral oil for applying brakes. It will be understood that the sealing of brakes is of much greater importance than the sealing of the other controls. In hydraulic brakes, it is necessary to entirely eliminate leakage of fluid from the system.

It is, therefore, one of the objects of my invention to provide a novel and efficient sealing means for hydraulic brakes, which sealing means may be used with any desired kind of hydraulic fluid.

Other objects and advantages of my improved brake will be apparent in the course of the following detailed description. Reference in the description will be had to the accompanying drawings, in which:

Figure 1 is a view in vertical section through the brake, just inside the head of the brake drum, and showing in elevation the assembled brake elements;

Figure 2 is a horizontal partial sectional view of the wheel cylinder of Figure 1;

Figure 3 shows in perspective the novel force transmitting element interposed between the piston and brake shoe of Figures 1 and 2;

Figure 4 is a view in perspective of the element shown in Figure 3, but taken from the opposite side;

Figure 5 shows in detail the novel shoe centralizing means;

Figure 6 is taken along the line 6—6 of Figure 1 and shows in detail the adjustment locking means.

Fig. 8 is a sectional view of the spring loaded adjustment.

Figure 7:
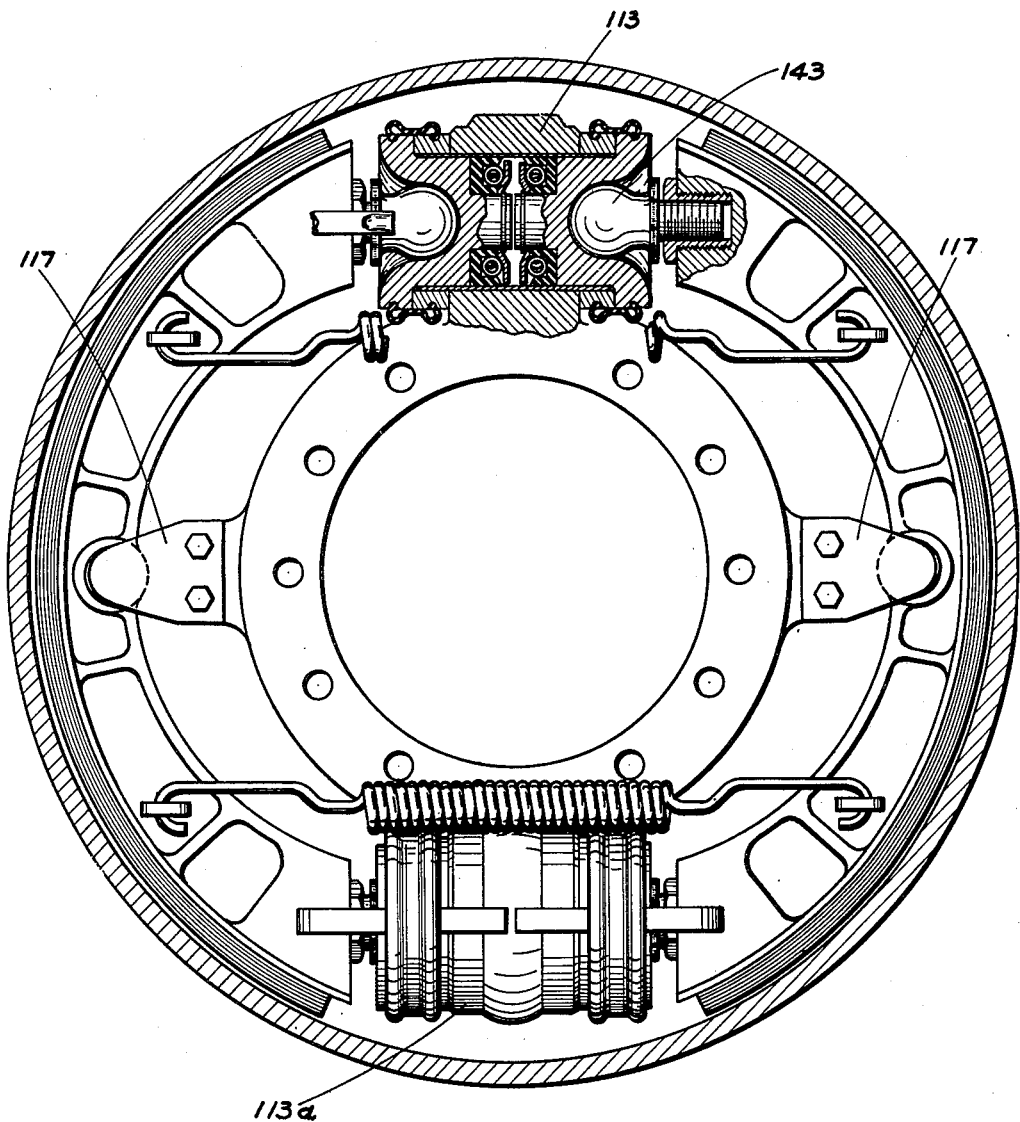
Figure 7 shows a modification of the brake of Figure 1.

As shown in Figure 1, the brake assembly comprises a brake drum 10, brake shoes 11 and 12, and a hydraulic cylinder 13 for moving the shoes into frictional contact with the drum to oppose rotation of the drum.

A stationary backing plate 14 is adapted to transmit braking torque to the vehicle frame (not shown). The backing plate 14 has fixed thereto by a plurality of bolts a brake spider 15, which has an extension 16 for supporting and maintaining against rotation the cylinder 13.

Attached to the spider are a pair of centering devices 17, each of the centering devices being associated with a separate brake shoe and serving to position its associated shoe in a manner to be described hereinafter. The brake shoes 11 and 12 are identical in construction and each comprises a bifurcated web portion 18 and a friction lining 19 riveted to the web portion 18. An adjustable strut 20 connects the shoes 11 and 12 at one end of the said shoes. Pins 21 fix the strut to the two shoes, and a spring 27 is stretched between the connected ends of the shoes, the said spring 27 having a function to be hereinafter more particularly described.

Each of the shoes is provided with a spring-loaded adjustment 22 for positioning the shoe relative to the spider 15. In order to accommodate the adjustment 22, each shoe is provided with a substantially solid web at a location near the cylinder 13. The bifurcated portion of the shoe web merges into a solid block portion at 22. An internally threaded bore is then made through this solid portion of the shoe web and a hollow boss 23 is screwed into the bore. A spring is dropped into the hollow center of the boss 23 and a rod having an enlarged end 24 is then inserted into the boss, the said rod protruding from the other end of the boss and having a nut screwed on the protruding end (not shown) of the rod to preload the spring. The end 24 of the rod, which at times contacts the spider 15, is arranged to abut on the spider when the brakes are in released position and thereby to cooperate with spring 25 in properly positioning its associated brake shoe. The spring 25, it will be noted, is attached at one end to the brake shoe and at the other end to an abutment 26 on the device 17.

The hydraulic cylinder 13 is shown in part section in Figure 1, placed between the ends of the brake shoes 11 and 12, and arranged to move the shoes into engagement with the drum 10. The cylinder 13 is provided with a pair of pistons 28 and 29, reciprocable in the cylinder. Upon admission of fluid from the hydraulic system to the interior of cylinder 13, the pistons 28 and 29 are moved outward spreading the shoes. A return spring 30 is attached to the shoes 11 and 12 by pins 31 and 32, respectively, said spring serving to return the ends of the shoes to brake released position when the pressure in the hydraulic system is relieved.

Figure 2 shows in more detail the cylinder 13 and its associated brake-applying elements. The two sides of the cylinder 13 are identical as are also the two pistons 28 and 29 together with the elements associated respectively with pistons 28 and 29. Therefore, only one side of the cylinder 13 and only the piston 28 with its associated elements will be specifically described. As will be noted, an annular sleeve 33 surrounds the piston 28 and prevents any portion of the piston from frictionally engaging the inner wall of cylinder 13. This sleeve 33 is preferably formed of Bakelite, micarta, or a similar plastic compound, and serves to prevent the scoring of the cylinder interior which may be caused by the engagement of a metal piston against a metal cylinder. This is especially important when aluminum pistons and aluminum cylinders, in accordance with growing usage, are used together. The sleeve 33 is prevented from moving longitudinally relative to the piston 28 by small annular engaging abutments on each end of the piston.

As I have previously stated, it is one purpose of my invention to provide a seal which is satisfactory when used in a liquid brake system whether the liquid used is the ordinary hydraulic brake fluid or is some form of mineral oil. The satisfactory seal for use with the usual kind of hydraulic brake fluid is made of rubber, and is made, in most cases, in the shape of a cup. Since it is often desired to use a highly refined mineral oil, as for example sperry oil, in airplane brakes because it may be drawn from the same source as the fluid used to actuate the other airplane controls, it is necessary to discover a type of sealing means which will work with mineral oil. The usual rubber cup is not satisfactory for this purpose because the rubber is caused to swell by the mineral oil, and rubber is also subject to deterioration when maintained in contact with mineral oil.

In order to provide a seal which is not injured by contact with mineral oil, I have designed for use a seal made of synthetic rubber. However, a synthetic rubber seal of the customary cup shape has certain disadvantages. Synthetic rubber does not have the resiliency of natural rubber, and therefore does not snap back to its original shape immediately after brake application. Particularly in the use of parking brakes and in extremely cold weather, the synthetic rubber cup tends to remain in compressed position, i. e., with the junction surface of the bottom and sides of the cup pressed outward into contact with the cylinder wall. With the cup in this position, there is danger that the lip of the cup will not seal against the cylinder wall and will allow seepage of liquid out of the brake system.

I have, therefore, designed a novel seal shown generally at 34, which comprises an annular radially extending flange 35 and an axially directed lip or flange 36. It will be noted that the surface of the seal 34 which faces toward the piston 28 has a considerable degree of curvature. This has the effect of preventing the surface 37 which connects the flanges 35 and 36 from being flattened against the wall of the cylinder. It will also be noted that a large opening is cut out through the bottom of the seal 34. This allows the radial flange of the seal during expansion to expand inwardly as well as outwardly. The seal 34 is held tightly against the piston 28 by a metal washer 38 clamped against the seal by a nut 39 threadedly engaged with a projection 40 on the piston 28.

Figures 2, 3 and 4 show in detail the piston-to-shoe connections of my improved brake and the means for preventing cocking of the piston. The end of piston 28 which faces toward the shoe 12 is hollowed out as shown at 41 and provided with a concave torque receiving surface 42. A force transmitting element 43 is placed intermediate the piston surface 42 and the shoe 12. The element 43 has a convex piston engaging surface 44 and a flat shoe engaging surface 45. The element 43 is prevented from moving any substantial distance laterally with respect to the shoe 12 by means of projections 46 and 47 on the surface of element 43 which are inserted into a groove 48 in the end of the shoe 12. The end of the shoe 12 is free to slide radially of the brake drum 10, and thus adjust its position as the shoes are moved against the drum. A part annular abutment 49 on the inner side of the element 43 serves to prevent wedging of the shoe between the cylinder and the brake drum during brake applications when the shoe is serving as a secondary or anchor shoe.

In application of the brakes, pressure fluid is admitted to the cylinder 13, spreading the pistons 28 and 29. The seal 34 prevents the escape of fluid from the cylinder, and the sleeve 33 provides a smooth sliding surface between the pistons and the cylinder wall. The shoe which is acting as primary, or applying, shoe will tend to move downward, cocking the element 43 but not cocking the piston because of the clearance between the wall 41 of the piston and the lower side of the element 43. The sliding motion of the shoe and the convexo-concavo engagement of the piston 28 with the element 43 will transmit the braking torque to the center of the piston. The outer corners of the abutment 49 will prevent excessive lateral movement of the shoe with respect to the piston. In case the shoe is serving as secondary, or anchoring, shoe, the registration of the abutment 49 with the upper surface of the piston wall 41 will prevent upward movement of the shoe end into wedging engagement with the cylinder and drum. At the same time, the sliding contact of element 43 on surface 42 will prevent cocking of the piston.

Figure 5 shows my novel shoe centering device 17. The device 17 is bolted to the spider 15 and extends between the forks of the shoe web. Slidable in projections 50 on the end of device 17 are bosses 51, pressed against the forks of the shoe web by coil springs 52. The shoe is thus allowed a slight lateral movement against the resilient opposing pressures of the springs.

In Figure 6, the adjustment strut 20 of spring 27 are shown in greater detail. A star wheel 53 may be turned to either draw together or separate the shoe ends. The ends of the spring 27 are hooked in the webs of the shoes 11 and 12, and the spring intermediate its ends fits into the adjacent groove in the surface of the wheel 53 to lock said wheel against rotation.

In Figure 7 is shown a wheel brake having two oppositely disposed hydraulic cylinders 113 and 113a. Centering devices 117 are provided, similar to those of Figure 1. Also, as noted in cylinder 113, the forces from the pistons to the shoes and vice versa are transmitted by element 143 having a concave surface, said surface contacting a concave hollow in the outer face of the piston.

The above described embodiments of my invention are to be recognized as merely being exemplary of my invention and not as limiting it, the limitations to be adduced only from the terms of the appended claims.

I claim:

1. For use with a brake having a brake shoe and a motor with a piston therein arranged to actuate said shoe, a connecting element comprising a base portion adapted to contact the end of said shoe and at times to anchor against the wall of said motor, and a projection with a convex forward surface, said projection having an abutment thereon intermediate the base of the connecting element and the convex forward surface of the said projection for limiting radial outward movement of the connecting element with respect to the piston.

2. For use in a hydraulic brake actuating cylinder having a metal inner wall, a piston reciprocable in the cylinder comprising a metallic body having a reduced diameter portion intermediate the ends thereof, and a non-metallic sleeve fitting snugly the reduced diameter portion of the metallic body and having its ends overlying the ends of the metallic body, the arrangement being such that the non-metallic sleeve extends the full length of the piston to prevent metal-to-metal contact of the metallic body and the cylinder wall while the sleeve is positioned longitudinally of the piston by having its central portion of smaller internal diameter than the ends of the metallic body.

3. In a hydraulic brake, a brake actuating device having a chamber, a piston reciprocable therein, and sealing means associated with said piston, said sealing means comprising an annular synthetic rubber resilient element having an outer surface gradually curved to leave substantial space between the said surface and the contact point of the piston and the chamber wall at the sealed end of the piston, a washer associated therewith and a nut pressing said washer against said resilient element.

4. In combination with a brake shoe and a brake applying motor having a piston therein with a concave face, a force transmitting element associated therewith having one surface adapted to slide on the end surface of said shoe and having a second surface with a convex portion adapted to fit against the concave face of said piston.

5. In combination with a brake shoe and a brake applying motor, a force transmitting element associated therewith having a surface adapted to slide on the end surface of said shoe and being arranged to at times anchor on the wall of said motor.

6. In a brake, the combination of braking means including a brake shoe, with actuating means for said brake shoe, said actuating means including a hydraulic motor and said actuating means allowing in one direction radial motion of the shoe away from the longitudinal axis of said motor and preventing said radial motion in another direction.

7. In a brake, the combination of braking means including a brake shoe, and actuating means for said brake shoe, said actuating means including a hydraulic motor and said actuating means allowing in one direction radial motion of the shoe away from the longitudinal axis of said motor and preventing said radial motion in another direction, with means yieldably maintaining the shoe against lateral movement.

8. In a brake, an actuating device having an annular base portion, one surface of which is provided with a plurality of projections, a part conical, part spherical body portion integral with said base portion, and a part annular abutment associated with said body portion.

9. In a brake having a brake shoe, a hydraulic applying cylinder, and a shoe actuating piston reciprocable in the cylinder; a thrust transmitting device having a flat sliding surface on one end thereof, a spherical sliding surface on the other end thereof, and an annular projecting surface transmitting the ends thereof, each of said surfaces normally contacting a different element of the brake, the first mentioned surface the shoe, the second mentioned surface the piston, and the third mentioned surface the cylinder wall.

FREDERICK C. FRANK.